United States Patent [19]
Okada et al.

[11] Patent Number: 4,716,476

[45] Date of Patent: Dec. 29, 1987

[54] TAPE RECORDING APPARATUS

[75] Inventors: Hiroshi Okada; Takao Takahashi; Hajime Inoue, all of Tokyo, Japan

[73] Assignee: Sony Corporation, Tokyo, Japan

[21] Appl. No.: 817,544

[22] Filed: Jan. 10, 1986

[30] Foreign Application Priority Data

Feb. 5, 1985 [JP]  Japan .................................. 60-20682

[51] Int. Cl.⁴ .......................... G11B 5/03; G11B 15/14
[52] U.S. Cl. .......................................... 360/66; 360/64
[58] Field of Search ......................... 360/66, 64, 61, 63

[56] References Cited

U.S. PATENT DOCUMENTS

| | | | |
|---|---|---|---|
| 2,468,782 | 5/1949 | Ross et al. ........................... | 360/61 |
| 4,005,481 | 1/1977 | Lackner .............................. | 360/66 |
| 4,390,915 | 6/1983 | Matsuyama ......................... | 360/66 |

*Primary Examiner*—Vincent P. Canney
*Attorney, Agent, or Firm*—Vorys, Sater, Seymour and Pease

[57] ABSTRACT

In a tape recording apparatus having a rotary guide drum on which a tape is helically wrapped, a second erase head is secured on a rotary body included in the tape guide drum for erasing recorded tracks on the tape when the tape is driven in the reverse direction in addition to a first head secured on the rotary body for erasing recorded tracks on the tape when the tape is driven in the forward direction, whereby the erasing and recording operations can be made in both cases when the tape is moved in the forward direction and when it is moved in the reverse direction.

15 Claims, 24 Drawing Figures

TAPE RECORDING APPARATUS

BACKGROUND OF THE INVENTION

The present invention relates to a magnetic tape recording apparatus having a plurality of rotary magnetic heads in which a newly designed flying erase head is provided so that only a necessary region on the magnetic tape can suitably be erased when the tape is moved to record information signals thereon in the forward direction and in the reverse direction.

FIG. 1 shows a tape format of a so-called 8 mm video tape recorder.

In FIG. 1, numeral 2 denotes a magnetic tape, numeral 3 denotes a recording track, numeral 4F denotes a tape moving direction during normal recording and 4H denotes a head scanning direction.

A length of each recording track 3 corresponds to a rotation angle of 216° of a rotary magnetic head. An audio signal is usually recorded on a segment 3S of each track 3 (denoted by hatched the area of each track in FIG. 1) corresponding to a rotation angle of 36 degrees of the rotary magnetic head and, on the other hand, a video signal is usually recorded on the remaining segment 3V of each track 3 (denoted by blank the area of each track in FIG. 1) corresponding to an angle of 180° of the rotary magnetic head. It should be noted that the audio signal to be recorded on the segment 3S has been converted into a PCM (Pulse Code Modulated) signal and has been compressed to a time axis compressed signal so as to be positioned on the segment 3S. On the other hand, the video signal on the remaining segment 3V is a signal for each field interval, wherein a luminance signal (Y signal) is converted into an FM (Frequency Modulated) signal and a chrominance signal is frequency converted into a lower frequency range. In this case, an odd field chrominance signal and an even field chrominance signal are modified to have a frequency-interleaving relationship with each other.

Furthermore, one track is located adjacent to another track and one azimuth angle with respect to each record pattern on one group of tracks grouped for every other track and the other azimuth angle with respect to each record pattern on the other group of remaining tracks grouped for every other track are different from each other. It should be noted that pilot signals for a tracking servo used during a signal reproducing operation is, furthermore, superposed over the whole length of each track 3.

It should be noted that for simplification of this specification, the length of the audio signal recording segment 3S has been set so as to correspond to the rotation angle of 36 degrees as described above and over the whole length of which the PCM audio signal is recorded.

FIG. 2 shows a conventional arrangement of rotary magnetic heads in the 8 mm video tape recorder.

In FIG. 2, numerals 1A and 1B denote a pair of rotary magnetic heads mounted on a rotary drum 5, having a mutual angular interval of 180 degrees with respect to a center of the rotary drum 5, and rotated in the head scanning direction 4H at a frame frequency (30 Hz) of the video signal. In addition, a rotary erase head 1F is installed at a position on the drum 5 having a different height from the heads 1A and 1B and which corresponds to, e.g., 90 degrees apart from the head 1A, i.e., 90 degrees prior to the head 1A. A track width (erasing i.e. the gap width) of the rotary erase head 1F is twice as wide as each of effective gap widths of the pair of heads 1A and 1B.

The tape 2 is wound spirally over an angular range of 216 degrees or greater on a peripheral surface of the rotary drum 5 and is moved along a predetermined direction denoted by the numeral 4F.

With a flow of erase current into the rotary erase head 1F during the recording operation, one scanning of the head 1F permits a simultaneous erasing of recording patterns on two tracks and thereafter the track 3 is sequentially formed on the tape as shown in FIG. 1 by means of the heads 1A, 1B.

It has been proposed that for the tape format described above, another audio signal is recorded on the video signal recording segment 3V in place of the video signal. FIG. 3 thus shows a multi-audio tape format of the 8 mm video tape recorder.

As shown in FIG. 3, the video recording segment 3V is divided into five segments for each rotation angle of 36 degrees so that each track 3 is divided into six segments along the length thereof. During a first recording of the audio signal, only the segment denoted by (1) among the divided segments (1) through (6) is used when the audio signal is recorded on each track 3. During the second recording thereof, only the segment denoted by (2) among the divided segments (1) through (6) is used when the audio signal is recorded on each track 3. In this way, when the audio signal is recorded, only one of the six divided segments (1) through (6) is selectively used.

It should be noted that, at this time, the audio signal is recorded in the same signal format as the PCM audio signal which is to be recorded on the segment 3S. In addition, an order in which the divided segments (1) through (6) are to be used is arbitrary. Furthermore, while the audio signal on any one of the divided segments (1) through (6) is recorded, the moving direction of the tape 2 is not limited. For example, when the audio signal is recorded on any one of the segments (1), (3) and (5), the tape 2 may be moved in the forward direction 4F and when it is recorded on any one of the segments (2), (4) and (6), the tape 2 may be moved in the reverse direction 4R.

Therefore, the same tape 2 may aribitrarily be used for either video or all audio recording/reproducing medium. If the tape 2 is used for the all audio recording medium, an audio signal recording having an elapsed time six times longer than the video signal recording can be achieved.

Furthermore, since the tape running direction for each of the segments (1) through (6) is not limited, it is not necessary to rewind the tape from a tape end to a tape top when the recording tape has reached the tape end and the tape recording apparatus can conveniently be used as a reversible tape recorder merely by switching the running direction of the tape 2.

The tape recording apparatus described with reference to FIGS. 1 through 3 is exemplified by Japanese Patent Application Serial No. Sho. 57-15,287 filed on Feb. 2, 1982 (published on Dec. 24, 1983 as the Unexamined Open No. Sho 58-222,402 and which corresponds to U.S. patent application Ser. No. 463,337 now pending).

In the above-described all-audio mode of the tape recording apparatus, when the tape 2 is moved in the forward direction to record the audio signal on the segments (1) through (6), the rotary erase head 1F needs to erase a part of the tape surface to be recorded prior to the recording of the audio signal thereon in the same way as the video signal recording operation.

However, when the tape 2 is moved in the reverse direction to record the audio signal on the segments (1) through (6), a part of the tape surface on which either of the heads 1A, 1B has scanned and recorded the audio signal also needs to be scanned by means of the rotary erase head 1F following the scanning operation of either one of the heads 1A, 1B, so that the head 1F immediately erases the already recorded surface on the tape which has been scanned and recorded by either head 1A or 1B. In this case, since the scanning operation of the erase head 1F is followed by the recording operation of either of the heads 1A, 1B, the head 1F always erases any recording segment track part on which either of the heads 1A, 1B carries out the new recording of and audio signal immediately after the new recording operation by means of the head 1A, 1B. Therefore, in the above-described tape recording apparatus, no normal recording of the audio signal on the tape can be made when the tape 2 is moved in the reverse direction.

SUMMARY OF THE INVENTION

With the above-described problem in mind, it is an object of the present invention to provide a tape recording apparatus which carries out the audio signal recording on divided segments of each track on the tape when the tape is moved in the reverse direction as well as the forward direction.

This can be achieved by providing the tape recording apparatus with another rotary flying erase head for the recording operation in the reverse direction of tape, mounted on the rotary drum with a predetermined angular relationship to the other heads so that the newly mounted rotary erase head erases a region of tape to be recorded when the tape is moved in the reverse direction.

BRIEF DESCRIPTION OF THE DRAWINGS

A more complete understanding of the present invention may be obtained from the following detailed description taken in conjunction with the attached drawings in which like reference numerals designated corresponding elements and in which.

DETAILED DESCRIPTION OF THE PREFERRED EMBODIMENT

Reference will hereinafter be made to the drawings in order to facilitate understanding of the present invention.

(A) Mechanical Part

Figure 1:
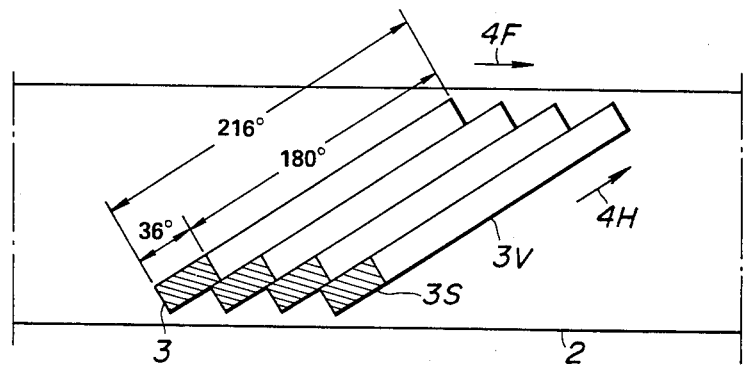
FIG. 1 is a tape format for video and audio signal recording on a tape of an 8 mm video tape recorder disclosed in Japanese Patent Application Unexamined Open No. Sho. 58-222,402.
Figure 2:
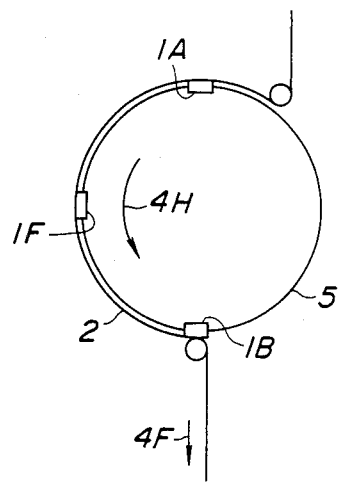
FIG. 2 is a plan view of a rotary drum mechanism disclosed in the same Japanese Patent Application identified above.
Figure 3:
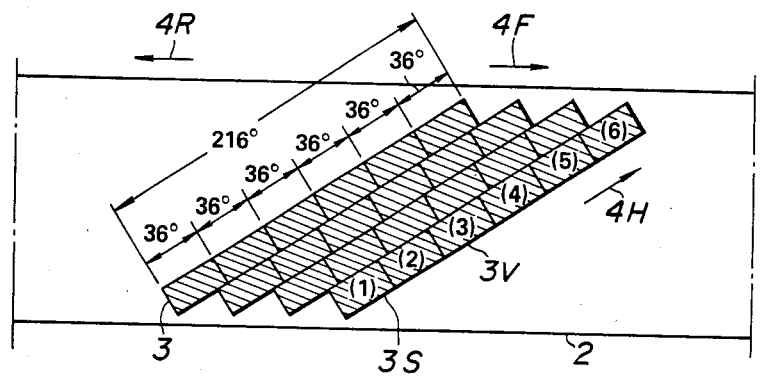
FIG. 3 is another tape format for multi-audio signal recording on the tape disclosed in the same Japanese Patent Application identified above.
Figure 4:
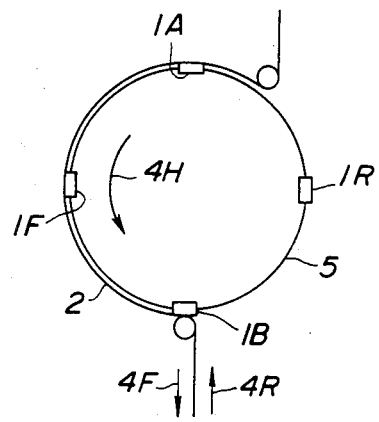
FIG. 4 is a plan view of a rotary drum mechanism in a tape recording apparatus of a preferred embodiment according to the present invention.
Figure 5:
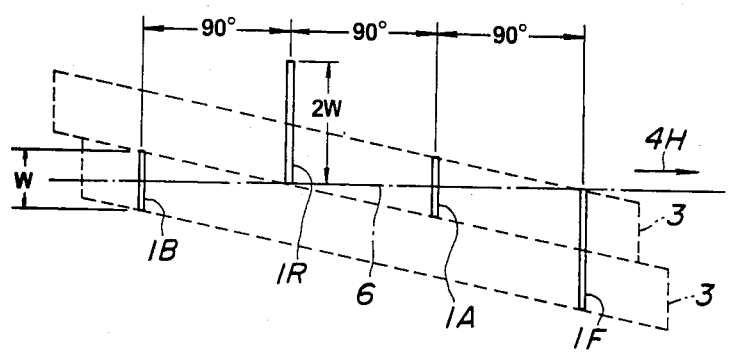
FIGS. 5(A) and 5(B) are explanatory views of each position of the heads with respect to a tape movement on the rotary drum mechanism in FIG. 4.
Figure 5:
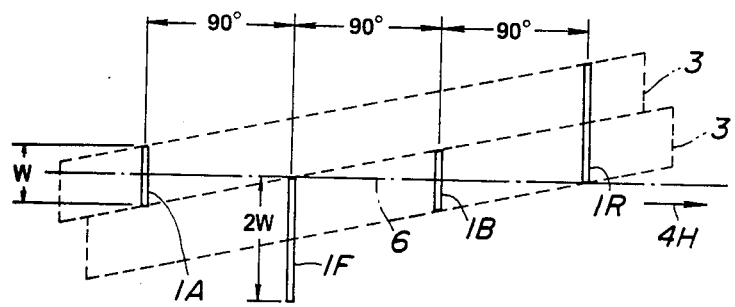
Figure 6:
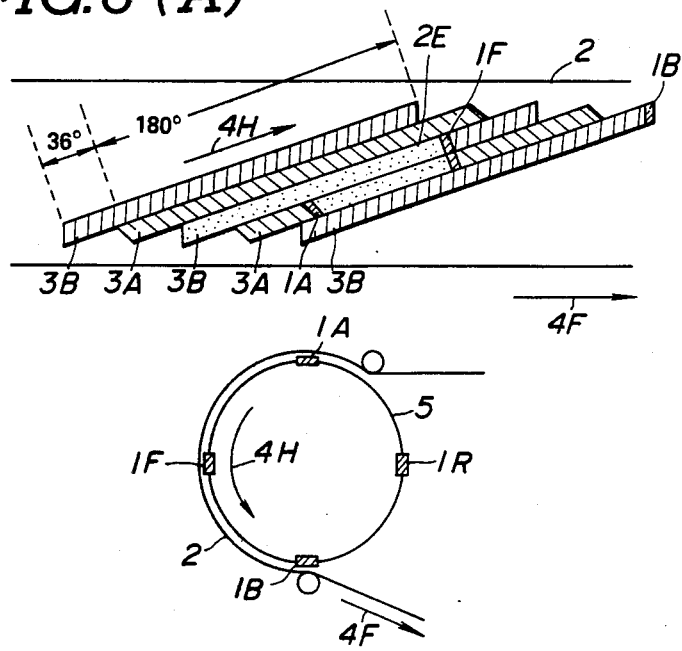
FIGS. 6(A) through 6(D) are explanatory views of the angular movement direction of the rotary drum mechanism in the case of the forward direction movement of tape and tape recording formats.
Figure 6:
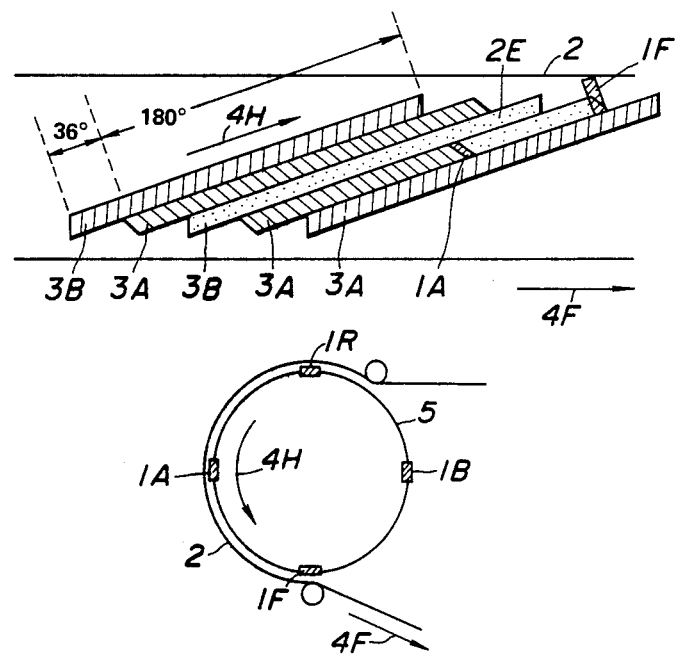
Figure 6:
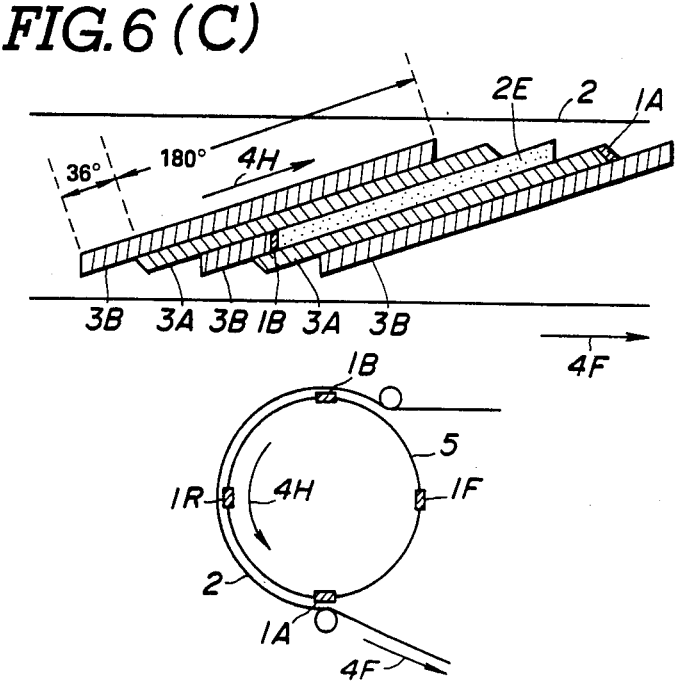
Figure 6:
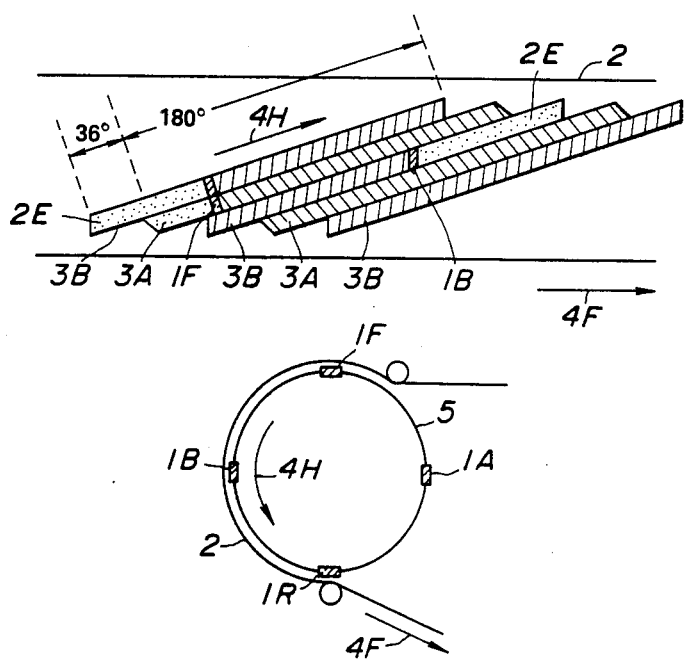

FIGS. 4 through 5(B) show a preferred embodiment of the tape recording apparatus.

FIG. 5(A) is an unfolded view of a rotary drum mechanism in which rotary magnetic heads are mounted on the drum for explaining relative positions of the tape and the heads when the tape is moved in the forward direction. FIG. 5(B) is the same view of the rotary drum incorporating magnetic heads when the tape is moved in the reverse direction for explaining same.

The rotary drum mechanism 5 is provided with the rotary erase head 1F located at a position thereon above which the tape reaches earlier than the head 1A and having an angular interval of 90 degrees subtending each head 1A, 1B. The drum mechanism 5 is furthermore provided with another rotary flying erase head 1R located at a position thereon above which the tape reaches later than the head 1A. It should be noted that if a track width, representing an effective gap width, of each head 1A, 1B, that is to say, a width of each track is denoted by W, each track width (or erasing gap width) of the heads 1F, 1R is denoted by 2W. That is, the erasing heads 1F and 1R are twice as wide as the recording heads 1A and 1B. In addition, a height difference is provided for the erasing heads 1F, 1R in such a way that an end of each the heads 1F, 1R is positioned at a dot-and-dash line 6 indicating the center of each head 1A, 1B. The head 1F is placed at the trailing end of the track with respect to the line 6 and the other head 1R is placed at the starting end of the track with respect to the line 6. The tape 2 is spirally wound around rotary peripheral surfaces of these heads 1A, 1B, 1F, and 1R over 216 degrees or greater of the angular range.

The tape recording operation in both forward 4F and reverse 4R directions of the tape 2 is carried out as shown in FIGS. 6(A) through 7(D). For explanation conveniences, the signal recording on the tape is carried out over the whole length of each track 3.

FIGS. 6(A) through 6(D) show a situation of tape format in which the tape advances around the head drum 5 in the forward direction 4F. In this case, an erase current flows through the head 1F to energize the head 1F. FIG. 6(A) shows a state in which the head 1B has finished scanning the tape 2. At this time, one track 3B is formed on the tape over the rotation angle of 216 degrees angle and an area of the adjacent track region denoted by dots has already been erased by means of the erase head 1F.

FIG. 6(B) shows a subsequent state in which the heads 1A through 1R have rotated through a ¼ (quarter) rotation from the state shown in FIG. 6(A) (at a time after a ½ field interval has elapsed). In this state, a track 3A is formed over an angular interval of 126 degrees of the area 2E and the erased area is extended at the track end.

Furthermore, FIG. 6(C) shows a state in which the heads 1A, 1B, 1F, and 1R have been rotated further by a ¼ rotation from the state shown in FIG. 6(B). In this state, the track 3A is fully formed and the other head 1B has been placed at a position at which recording of signal on the section (1) has completed.

FIG. 6(D) shows a state in which the heads 1A, 1B, 1F, and 1R have been rotated further by a ¼ rotation from the state shown in FIG. 6(C). In this state, the track 3B is formed over the angular range of 126 degrees and the erase head 1F is placed at a position at which the section (1) has been erased.

If the heads 1A, 1B, 1F, and 1R have rotated further by the ¼ rotation from the state shown in FIG. 6(D), the position of tape with respect to each head is changed as shown in FIG. 6(A). In this way, a similar operation is repeated.

If the tape 2 is moved in the forward direction 4F, the audio signal is recorded on any one of the segmetns (1) through (6). The head 1F receives an erase current only during an interval for which the head 1F scans the corresponding segment. Hence, when the tape 2 is moved in the forward direction to record the audio signal, the erasing and recording of the audio signal can be carried out without failure.

FIGS. 7(A) through 7(D) show a second situation in which the tape 2 is moved in the reverse direction 4R. In this situation, an erase current flows in the head 1R in place of the head 1F.

Figure 7A:
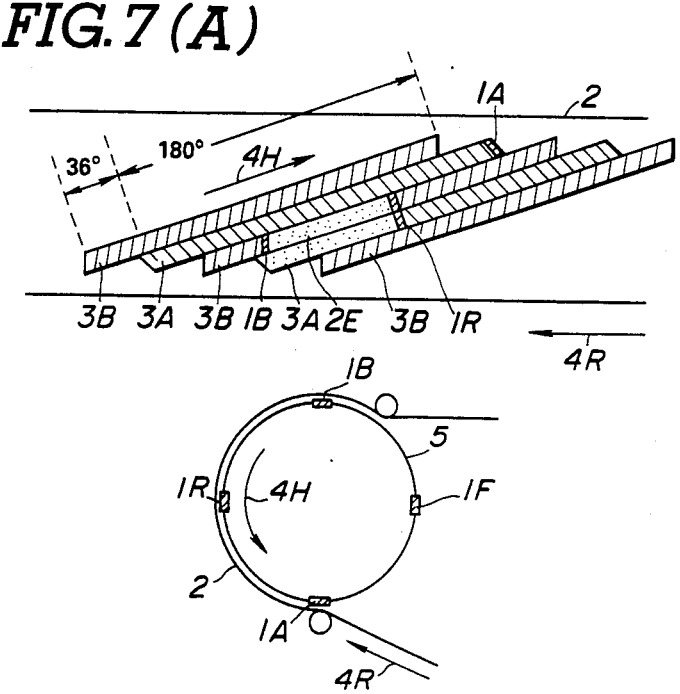
FIGS. 7(A) through 7(D) are explanatory views of the angular movement direction of the rotary drum mechanism in the reverse direction movement of tape and tape recording formats.

FIG. 7(A) shows a state in which the head 1A has ended the scanning of the tape 2. At this time, the head 1A scans a track over all of the whole segments corresponding to the rotation of 216 degrees and an area denoted by dots 2E has already been erased by the erase head 1R.

Figure 7B:
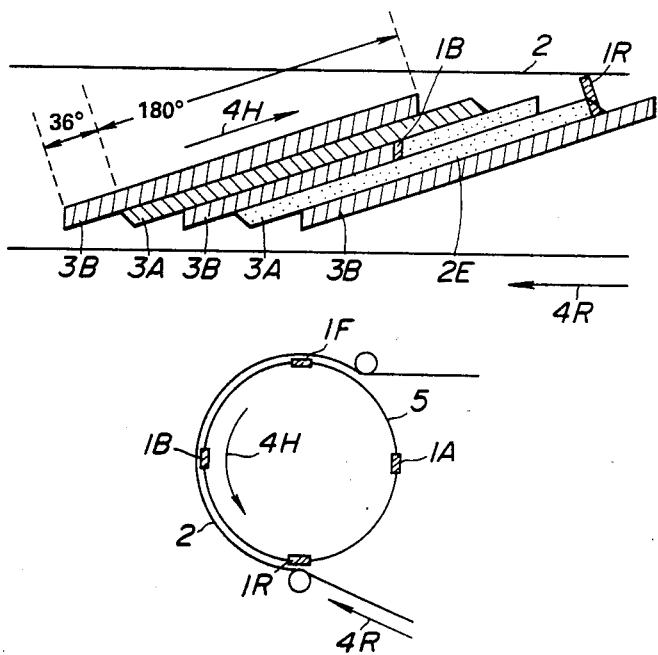

FIG. 7(B) shows a state in which the rotary magnetic heads 1A, 1B have been rotated by a ¼ rotation from the state shown in FIG. 7(A). The track 3B is thus formed over the rotation of 126 degrees on the area 2E, and the erase area 2E has reached the end through the erase operation by means of the erase head 1R.

Figure 7C:
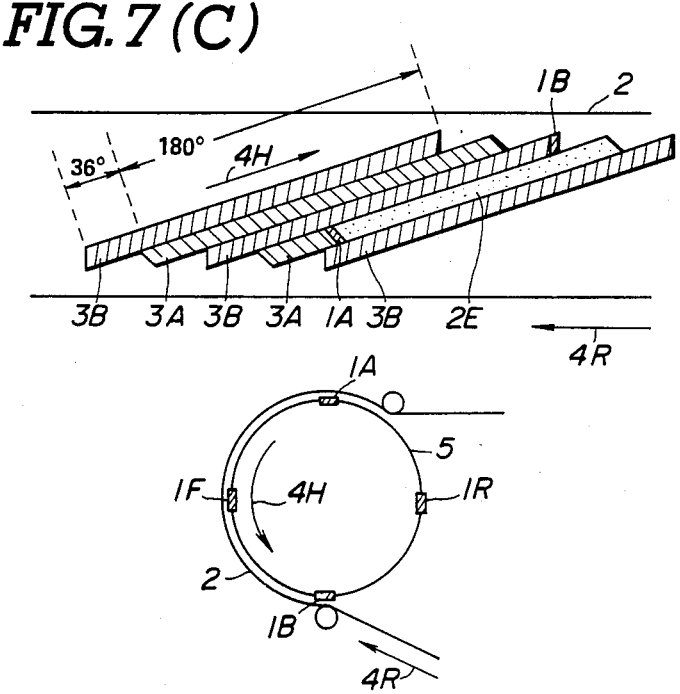

FIG. 7(C) shows a state in which the heads 1A, 1B, 1F, and 1R have been rotated by the ¼ rotation from the state shown in FIG. 7(B) and the head 1A is placed at a position at which the head 1A has completed the recording of the signal on the segment (1) of a track.

Figure 7D:
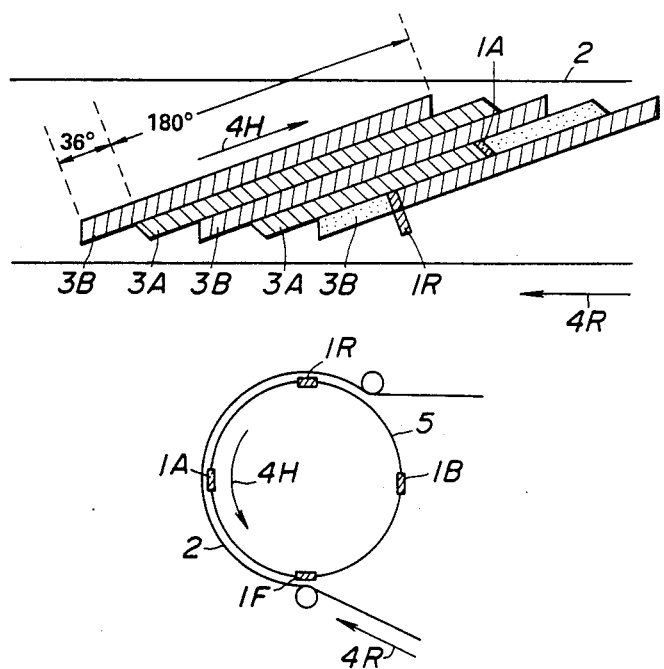

FIG. 7(D) shows a state in which the heads 1A, 1B, 1F, and 1R have been rotated by the ¼ rotation, the head 1A is formed over an area corresponding to the rotational angle of 126 degrees, and the head 1R is placed at the starting end of the segment (2) which is to be the erasing area 2E.

If the heads 1A, 1B, 1F, and 1R have been rotated further through a ¼ rotation from the state shown in FIG. 7(D), the state shown in FIG. 7(A) is returned and the same operation is thereafter repeated.

When the tape 2 is moved in the reverse direction 4R to record the audio signal on any one of the segments (1) through (6), the head 1R is energized by the erase current only during the interval for which the head 1R scans the corresponding segment.

In this way, in the case when the tape 2 is moved in the reverse direction 4R to record the audio signal, the erasing and recording operations can be carried out without failure.

(B): Recording System

Figure 8:
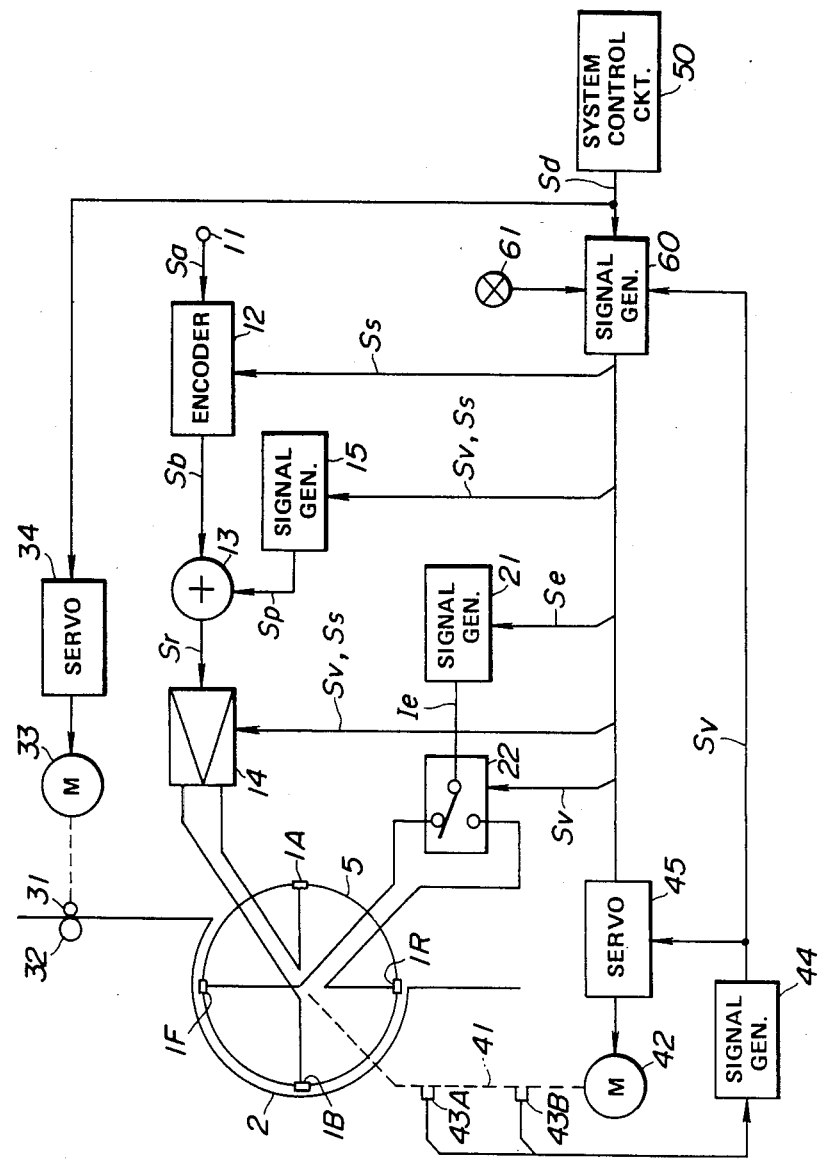
FIG. 8 is a schematic circuit block diagram of a recording system of the tape recording apparatus shown in FIG. 4.

FIG. 8 shows a circuit block diagram of an embodiment of a recording system in the tape recording apparatus of the present invention. Numeral 50 denotes a system control circuit for controlling an operation mode having mode switches for switching various modes of controls.

During the recording operation, a tape direction signal $S_d$ is formed in the control circuit 50 which specifies the running direction of the tape 2. The signal $S_d$ is sent to a control signal generator circuit 60. The control signal generator circuit 60 receives a signal from a switch 61 which specifies which of the segments (1) through (6) the audio signal is to be recorded.

Various kinds of control signals and timing signals are formed at the circuit 60 on the basis of an output signal of the switch 61, signal $S_d$, and a signal $S_v$. The functions of these signals will be described later.

On the other hand, the heads 1A, 1B, 1F, and 1R together with the drum mechanism 5 are rotated at the frame frequency (30 Hertz) by means of a motor 42 connected to a rotation axis 41. At this time, a pair of pulse generators 43A, 43B are, for example, mounted around the rotation axis 41 and produce pulses alternatingly whenever the drum has rotated through a ½ rotation. These pulses produced by the generators 43A, 43B are sent to a pulse signal generating circuit 44 to form a rectangular wave signal $S_v$ (FIG. 9A), synchronized with the rotation phase of the heads 1A, 1B, 1F, and 1R, having a logic level of "1" during a field interval $T_a$ for which the head 1A scans over the segments (2) through (6) of each track 3 and a logic level of "0" during a field interval $T_b$ for which the other head 1B scans over the segments (2) through (6). The signal $S_v$ is then sent to a drum servo circuit 45 to which a reference pulse having a predetermined phase is sent from the control signal generator circuit 60. A servo output signal of the drum servo circuit 45 is sent to the motor 42 so that the rotation of the heads 1A, 1B, 1F, and 1R is locked in the predetermined phase at the frame frequency of 30 Hertz. The signal $S_v$ is also sent to the control signal generator circuit 60 as a signal indicating the rotational phase of the heads 1A, 1B.

The tape 2 is driven by means of a capstan 31 and pinch roller 32. At this time, the signal $S_d$ is sent to a capstan servo circuit 34, a servo output signal of which being sent to a capstan motor 33 so that the tape 2 is moved in the forward 4F or reverse direction 4R at a predetermined phase and speed.

The audio signal (stereo signal) $S_a$ is sent to a PCM encoder 12 via a terminal 11 in which the signal $S_a$ is encoded into an audio PCM signal $S_b$ of a bi-phase mark form in which a length of the time axis of the signal is compressed by one-fifth, i.e., in the same format as the audio PCM signal in the 8 mm video tape recorder.

Figure 9:
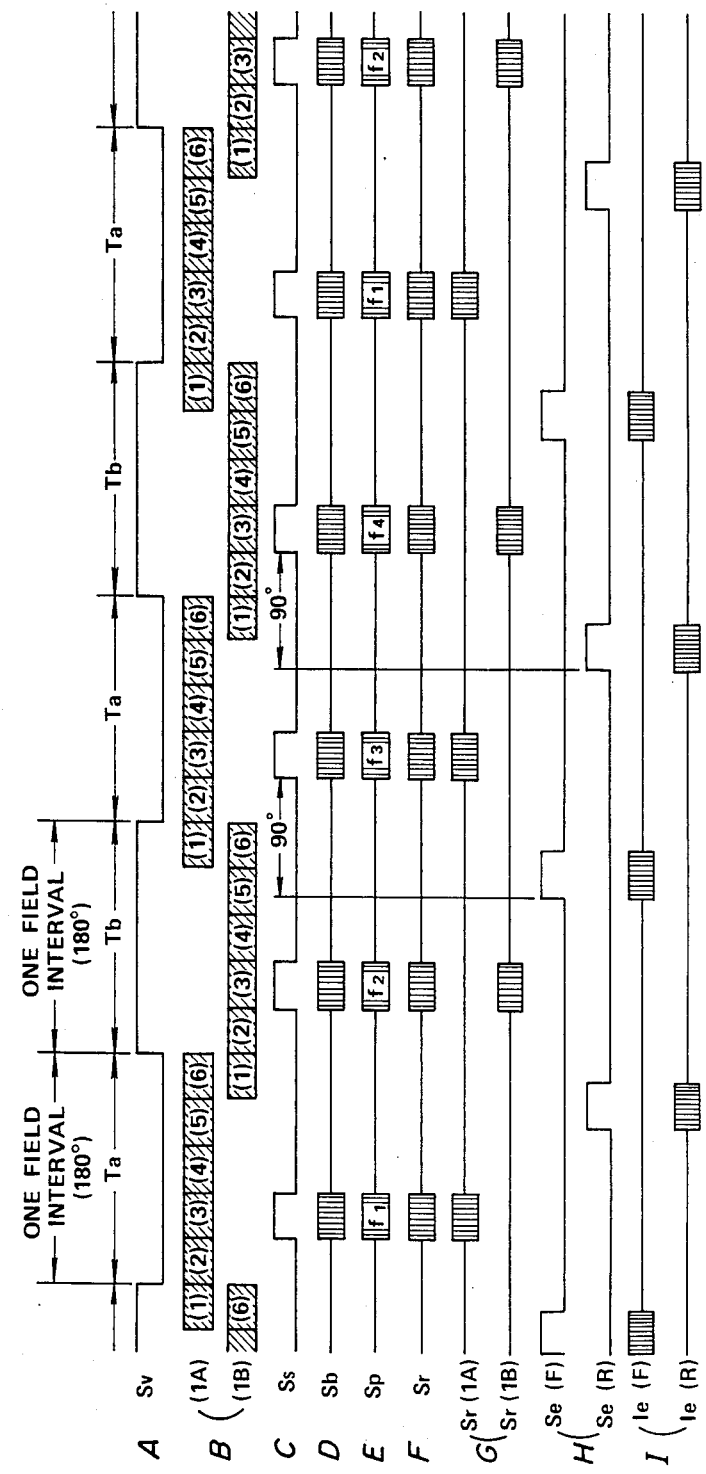
FIG. 9 A-I is a signal waveform chart in each circuit shown in FIG. 8.

In this case, if the PCM signal $S_b$ is recorded, for example, on the third segment (3) among the segments (1) through (6) of the track 3 on the basis of the output signal from the switch 61 described above, the control signal generator circuit 60 generates a segment signal $S_s$ having a logic level of "1" during an interval for which each of the heads 1A, 1B scans over the segment (3) indicating that the PCM signal $S_b$ is to be recorded on the segment (3), as shown in C of FIG. 9. The segment signal $S_s$ is sent to the encoder 12 so that the PCM signal $S_b$ is placed on the corresponding segment of the track during the logic level of "1" of the signal $S_s$ ($S_s$="1")

and is taken out from the encoder 12 during this interval of time. The signal $S_b$ is then sent to an adder 13.

During an interval of time for which the signals $S_v$, $S_s$ are sent to a pilot signal generator circuit 15, a tracking servo pilot signal $S_p$ is formed during the reproducing operation and is also sent to the adder 13. The signal $S_p$ is the same as the pilot signal in the case of 8 mm video tape format and has frequencies repeatedly changed as frequencies $f_1$, $f_2$, $f_3$, and $f_4$ for each field interval of time, and has frequencies of $f_1$ or $f_3$ during the interval of time $T_a$ and of $f_2$ or $f_4$ during the interval of time $t_b$ (e.g., $f_1$ is approximately 103 KHz, $f_4$ is approximately 149 KHz).

Hence, a mixed signal $S_r$ is outputted from the adder 13 which is multiplexed in a frequency multiplexing form of the PCM signal $S_b$ and a pilot signal $S_p$ for each interval of time during which the signal $S_s$ takes a logic level of "1", as shown in F of FIG. 9.

As the signal $S_r$ is sent to a recording amplifier 14 together with the signals $S_v$, $S_s$, the head 1A receives the signal $S_r$ during an interval of $T_a$ ($S_s$="1") as shown in G of FIG. 9 and the head 1B receives the signal $S_r$ during an interval of $T_b$ ($S_s$="1").

When the signal $S_r$ is recorded on either of the segments (1) or (6), a time position at which the signal $S_s$ becomes a logic level of "1" is the same. Accordingly, if the segment (1) is selected for recording, the signal $S_v$ is inverted in the amplifier 14.

Furthermore, when the tape 2 is moved in the forward direction 4F, the control signal generator circuit 60 generates the signal $S_e$ having the logic level of "1" over an interval of 36 degrees from the time 90 degrees earlier than the time at which the signal $S_s$ is turned to a "1" during the interval of time $T_a$ and when the tape 2 is moved in the reverse direction 4R, the signal $S_e$ has the logic level of "1" over the interval of time corresponding to 36-degree rotation from a time 90 degrees earlier than the time at which the signal $S_s$ is turned to a "1" during the interval of $T_b$. The generated signal $S_e$ is sent to a signal generator circuit 21 which generates an alternating current $I_e$ for erase operation (for example, having a frequency of 8 Megahertz) during an interval of $S_e$ (="1"), as shown in I of FIG. 9.

The erase current $I_e$ is then sent to a switch circuit 22. When the tape 2 is driven in the forward direction 4F in response to the direction signal $S_d$ sent from the control circuit 50 to the switch circuit 22 as the control signal, the current $I_e$ is sent to the head 1F to energize it and when the tape 2 is moved in the reverse direction 4R, the current $I_e$ is, at this time, sent to the head 1R to energize it.

Therefore, either the the head 1F or head 1R permits only a region of the track corresponding to, for example, the segment (3) to be erased as described above and pemits the sequential recording of the audio signal $S_a$ in a form of the PCM signal $S_b$.

It should be noted that during the reproduction operation the tracking servo operation, is carried out with the pilot signal for the corresponding segment among the segments (1) through (6). At this time, the signal $S_r$ at the corresponding segment may be selected and decoded among the reproduction outputs. In this way, when the audio signal $S_a$ is recorded on each track with the tape moved in either the forward direction 4F or the reverse direction 4R, the tape recording of the audio signal can be carried out with only a necessary region on the tape previously erased.

Although in the above-described embodiment the heads 1F, 1R have angular intervals of 90 degrees with respect to the heads 1A, 1B, the positional difference may be provided in such a way that the heads 1F, 1R are placed on the tape 2 as shown in FIGS. 5(A) and 5(B) if the angular intervals relative to the heads 1A, 1B are changed. Furthermore, the numbers and effective gap widths of the heads 1F, 1R may be changed. It is possible that the video signal is recorded on the segment denoted by 3V. In addition, it is possible to make one recording of the audio signal using a plurality of segments (1) through (6) simultaneously.

In the tape recording apparatus according to the present invention, the audio signal $S_a$ can suitably be erased and newly recorded only on a necessary region of the tape tracks in both cases when the tape 2 is driven in the forward direction 4F and when the tape 2 is driven in the reverse direction 4R.

It will fully be understood by those skilled in the art that the foregoing description is made in terms of the preferred embodiment and various changes and modifications may be made without departing from the scope of the present invention which is to be defined by the appended claims.

What is claimed is:

1. A tape recording apparatus having a tape guide drum on which the tape is helically wrapped, comprising:
   (a) recording transducer means including a pair of recording heads mounted on a rotary body of said tape guide drum at the same height but 180 degrees apart from each other relative to the rotational direction of said rotary body so as to form a plurality of skewed tracks on said tape;
   (b) tape drive means for running said tape in both forward and reverse directions on command;
   (c) first erase head means secured on said rotary body at a position lower than said recording transducer means for erasing a pair of said skewed tracks simultaneously when said tape is driven in the forward direction by said tape drive means; and
   (d) second erase head means secured on said rotary body at a position higher than said recording transducer means for erasing a pair of said skewed tracks simultaneously when said tape is driven in the reverse direction of said rotary body.

2. The tape recording apparatus according to claim 1 wherein each of said skewed tracks is divided into six segments and said second erase head means erase selected one of the segments of said skewed tracks on command.

3. The tape recording apparatus according to claim 1, wherein effective recording gaps of said pair of recording heads have different azimuth angles relative to each other, and there exists no space between each recorded pattern.

4. The tape recording apparatus according to claim 3, wherein said first and second erasing head means have erasing gaps wide enough to erase the pair of skewed tracks simultaneously.

5. The tape recording apparatus according to claim 4, wherein each of said skewed tracks is divided into six segments and said second erase head means erase selected one of the segments of said recorded tracks on command.

6. The tape recording apparatus according to claim 5, wherein each of said segments includes time-compressed PCM audio signals.

7. The tape recording apparatus according to claim 5, wherein each of said segments other than one predetermined segment include video signals.

8. The tape recording apparatus according to claim 5, wherein each of said segments includes video signals.

9. The tape recording apparatus according to claim 1, wherein said first erase head means is mounted on said rotary body at said first position which is a predetermined angular interval with respect to said pair of recording heads and said second erase head means is mounted on said rotary body at said second position which is the same predetermined angular interval with respect to said pair of recording heads.

10. The tape recording apparatus according to claim 9, wherein said predetermined angular interval of both first and second erase means is 90 degrees.

11. A tape recording apparatus for recording signals on a magnetic tape, comprising:
a rotary drum structurally adapted to receive said tape about a predetermined angular length thereof along a helical path thereon;
tape driving means for driving said tape about said predetermined angular length on said drum, upon command, in either a forward running direction or in a reverse running direction;
recording transducer means, including at least a first recording head and a second recording head, mounted relative to said rotary drum to form a plurality of skewed tracks on said tape, each of said tracks defining a plurality of recording segments thereon, each of which is suitable for audio or video recording;
said first recording head and said second recording head having a predetermined width W and being located at a predetermined angular length apart at the same height relative to said drum to track an adjacent pair of said skewed tracks and to record on a selected one of said tracks when one of said first and second recording heads is energized;
erasing means for said adjacent pair of said tracks, said erasing means comprising a forward mode erase head and a reverse mode erase head, each having a width of at least 2W, said erase heads being respectively located lower and higher than said first and said second recording heads and respectively angularly forward and aft of one of said recording heads by predetermined angular intervals; and
means for selectively energizing said forward mode and said reverse mode erase heads when said tape is running in said forward or reverse directions, so than a signal is recorded on one of said tracks while at least a portion of said adjacent track is simultaneously erased by said energized erase head, said selectively energizing means permitting recording and erasing for either forward running or reverse running of said tape.

12. The apparatus as set forth in claim 11 wherein said first recording head, said forward erase head, said second recording head and said reverse erase head are respectively located about 90 angular degrees apart relative to said rotary drum.

13. The recording apparatus as set forth in claim 12 wherein an end of said forward erase head abuts an imaginary line approximately bisecting each of said first and said second recording heads at a trailing end of a track and an opposite end of said reverse erase head abuts said imaginary line at a leading edge of said track, as determined relative to said forward running direction.

14. The apparatus as set forth in claim 11 wherein said selectively energizing means includes means for controlling the forward and reverse running directions of the tape; means for specifying which of a plurality of segments on a track are to be recorded upon; and means for generating forward erase and reverse erase signals responsive to said running mode means.

15. The apparatus as set forth in claim 11 wherein said selectively energizing means permits recording at one of a plurality of segments on one of said skewed tracks while one of said erase heads erases at least a selected segment of said adjacent track.

* * * * *